United States Patent Office 3,458,371

Patented July 29, 1969

3,458,371

COMPOSITION AND PROCESS FOR POWDERLESS ETCHING

Paul Borth, Park Forest, and Joseph McKeone, Hazelcrest, Ill., assignors to Photo-Engravers Research Institute, Incorporated, Savannah, Ga., a corporation of Georgia No Drawing. Filed Nov. 12, 1965, Ser. No. 507,580
Int. Cl. C23f *1/02;* C01g *49/10*
U.S. Cl. 156—14 10 Claims

ABSTRACT OF THE DISCLOSURE

A ferric chloride etching solution and method for producing large etching depths in metals without the danger of undercutting side walls or reducing image areas which comprises utilizing a ferric chloride aqueous solution containing ascorbic acid and a water soluble thiourea derivative adapted to form a cuprous thiourea complex with cuprous ions.

This invention relates to the etching of photo-engraving, more particularly it relates to powderless etching, and provides a novel procedure for powderless etching and a novel composition for use in the procedure, whereby improvement in powderless etching is realized.

Photo-engraving copper printing plates which can be copper or brass, are made by depositing a photo-sensitive film on the plate, impressing on the film the image to be printed by exposing the film to light passed through a negative of the image, removing the unexposed film (which overlies the image area), and providing the remainder of the film (which serves to define the image area) in a hardened and acid-resistant condition by chemically treating or by baking this portion of the film. The plate is then contacted with an etching solution, and the solution attacks the copper of the image area, but not the copper covered by the acid-resistant coating, whereby the image is provided in relief on the plate.

From a consideration of the foregoing, it will be readily apparent that in order to accurately produce the image on the plate, it is necessary to control the extent to which the etching solution etches the sidewalls which form about the periphery of the image area as the etching progresses. With respect to etching of the sidewalls, this can be considered as involving two actions on the sidewalls. One of these is the reduction of printing area due to sidewall etching and is referred to or measured as "etch factor," and the other is "undercutting action" which is a tendency for removal of metal from beneath etch portions of the acid-resistant coating. Etch factor is the ratio of depth of etch remote from the sidewall to sidewall etch at the printing surface (i.e. the surface contacting the acid-resistant coating). As to undercutting, speaking in reference to the etching of type characters, in the case of actual undercutting, base of the characters would be narrower than the printing surface for the characters. In general, the base is broader than the printing surface and the problem is to provide a suitable sidewall slope inwardly from the edge of the acid-resistant coating to the plane of the image area provided in relief by the etching. Actual undercutting is undesirable; a right-angle sidewall is suitable, but in general, is not a practical condition to maintain, rather, in general, some inward slope is tolerable, but the inward slope should not be excessive so as to significantly reduce the image area in relief. In the past, a suitable etch factor has been provided and undercutting has been controlled by periodically interrupting the etching procedure and fusing an acid-resistant coating onto the sidewalls. Thus, at intervals during etching, the plates were removed from the etching bath, dried, treated to deposit powder on the sidewalls, and then fired to convert the powder into an acid-resistant film. This manner of preventing undercutting has the obvious disadvantage of requiring frequent interruption of the etching procedure. To obviate this disadvantage, it has been proposed to utilize a procedure wherein an acid-resistant film is formed on the sidewalls as the etching progresses. Thus, the sidewall protective film is provided, so as to speak, automatically as etching proceeds, and the periodic interruption of the etching is unnecessary. This new procedure is termed "Powderless Etching." It has been used successfully for the production of photo-engraving copper printing plates.

The basis powderless etching process is described in Jones Patent No. 2,746,848. As is described in the Jones patent, thiourea is included in the etching bath, and as etching proceeds a protective covering forms on the sidewalls of the image area. The same covering which forms on the sidewalls, of course, tends to form throughout the image area. To accommodate this condition, the etching procedure is modified so that any film formed on the image area is promptly removed. This is done by employing a splashing technique to contact the etching solution and the plate. The solution in the splash form travels a course substantially perpendicular to the image area, and upon striking the image area, abrades away any film which has formed. This splash, of course, also strikes the sidewalls, but the angle of incidence with the sidewalls is such that the protective film on the sidewalls is not removed. Further, the etching solution also strikes the acid-resistant coating which defines the image area. This, however, is without significance since the acid-resistant coating is not affected by impingement of the etching solution. An alternative to splashing process, is to carry out the etching while the plates are immersed in the etching solution, and removing the film from the image area, but not from the sidewalls, by suitably brushing the image area.

A problem that is encountered in the use of the powderless etching technique, especially when the copper ion concentration is at least about 4.5 ounces per gallon (3.4 gm./liter) in the etching bath, is the formation of an undesirable slope in the sidewall of the image area. In these cases the sidewalls approach more closely at a right angle to the surface of the etched plane of the image area rather than being slowly tapered. This is due to the fact that where the etching time is prolonged, as when extreme depth (e.g. over 0.015") is required, the etchant solution can diffuse through the protective film and attack the "protected" sidewalls, thus reducing the width of the relief image in an undesirable manner. Furthermore, undesirable sloping of the sidewalls promotes actual undercutting of the metal from beneath the etch portions of the acid-resistant coating and tends to destroy the image area.

It is a primary object of the present invention to provide an improvement in the powderless etching of copper, so as to permit a universally applicable system of powderless etching of copper for all types of relief images, to whatever depths are naturally obtained as a result of the finest of details in the resist image.

It is another object of this invention to provide a method of powderless etching whereby undesirable sidewall sloping will be eliminated.

It is another object of this invention to provide a powderless etching bath which will not cause undesirable sidewall sloping when utilized in etching photo-engraving copper.

It is a further object of this invention to provide an etching system for photo-engraving copper whereby etching can proceed for long periods of time producing large etched depths without the danger of undercutting sidewalls or reducing image areas.

Other objects and advantages of the present invention will be apparent upon a further reading of the specification and the appended claims.

We have unexpectedly discovered that when an etching bath comprising an aqueous ferric chloride solution, a water-soluble thiourea derivative adapted to form a protective film in the etching environment, and ascorbic acid, preferably L-ascorbic acid, is utilized to etch photo-engraving copper. The sidewalls which appear during etching are gradually tapered even after the copper concentration in the etching solution reaches five ounces per gallon or above. In this manner undesirable sloping of the sidewalls to form an angle of approximately 90° with the resist covered plate even at copper concentration in the etching solution of five ounces per gallon or over, is eliminated. In this manner copper can be etched for long periods of time to great depths without the danger of the metal beneath the etch portions of the acid-resistant coating being undercutted by the etching solution. Furthermore, by use of the etching solution of this invention great etching depth may be obtained without the danger of excessive image loss.

The phenomena whereby large etching depths can be obtained utilizing etching baths containing a high copper ion concentration without the danger of the slope of the sidewalls being deleteriously affected is due to the use of ascorbic acid in ferric chloride etching solutions containing a thiourea derivative as a film-forming agent. While the precise mechanism whereby the beneficial etching results are obtained through the use of ascorbic acid is not completely understood, it is believed that the ascorbic acid stabilizes the protective film which consists of cuprous thiourea complex formed by the reaction of the water soluble thiourea derivative with the copper oxidized by the ferric chloride solution so that this protective film which protects the sidewalls adjacent the image area will not be deleteriously affected when there is excess etching solution or excess copper present. In this manner slope of the sidewalls adjacent the image area will remain substantially unchanged and will not be affected by the amount of copper present in the etching solution, the depth of the etch or the length of time that the etching solution has been applied to the plate which is to be etched.

The ferric chloride is preferably used in a concentration of from aboue 20° Bé. (a 20% parts by weight aqueous solution of ferric chloride) to about 48° Bé. (a 50% parts by weight aqueous solution of ferric chloride). The most preferred concentration is about 30° Bé. (a 30% parts by weight aqueous solution of ferric chloride).

Any water soluble thiourea derivitive which will form a cuprous-thiourea complex with cuprous ions so as to provide a protective film may be used in the compositions of the present invention. Among the most preferred of these derivatives are: formamidine disulfide, which is a dimer of thoiurea; formamidine disulfide hydrochloride; ethylene thoiurea, thiourea; cuprous thiourea chloride; mixtures of the above, etc. The preferred concentration of the thiourea derivative or derivatives in the bath composition of the present invention is from about 0.4 gram per liter to about 4 grams per liter, depending upon the force with which the solution impinges upon the plate being etched. The most preferred concentration for use with the particular apparatus described in the examples is from about 1 gram per liter to about 3.5 grams per liter.

In order to obtain best results, the ascorbic acid should be added in an amount of from about 0.01 gram per liter of etching solution to about 1 gram per liter of etching solution. Generally, it is preferred to add from about 0.02 gram per liter of etching solution to about 0.1 gram per liter of etching solution of the ascorbic acid. While ascorbic acid may be added in amounts higher than 1 gram per liter of etching solution, it has been found that very high amounts of ascorbic acid tend to produce chipping of the protective film which also may deleteriously affect the slope of the sidewalls. Due to this fact and due to the fact that no additional beneficial results are obtained by utilizing amounts of ascorbic acid greater than 1 gram per liter, it is seldom necessary to utilize amounts of ascorbic acid greater than 1 gram per liter of etching solution. Amounts of ascorbic acid lower than 0.01 gram per liter of etching solution are seldom utilized. This amount is not sufficient to provide all of the aforementioned beneficial results obtained through the use of ascorbic acid.

The present invention is applicable to the treatment of copper photo-engraving plates which may contain about 99.99% parts by weight of copper, or which may contain a small amount (about 0.08% parts by weight) of silver, as well as to true copper alloy photo-engraving plates such as brass (up to 40% zinc, balance copper) and beryllium copper (from about 1% to 4% parts by weight of beryllium, balance copper). This invention is also applicable to the treatment of nickel alloy plates such as "Covar" (29% parts by weight of nickel, 17% parts by weight of copper, 55% parts by weight of iron, 1% parts by weight other). Nickel appears to react with thiourea derivatives in much the same manner as copper.

The etching bath of this invention may contain any of the conventional additives utilized to improve the etch rate of the bath, control the film formed by the thiourea derivatives, etc. Typical modifying agents which may be included in the composition of this invention are: pyrogallol, 2,4-diaminophenol dihydrochloride, tannic acid, as well as other agents set forth in U.S. Patent No. 3,161,-552 Bradley et al., monochloroacetic acid, dichloroacetic acid, monobromoacetic acid, sodium, acetate, etc. Any conventional additives may be utilized in the ferric chloride etching bath of this invention.

Any conventional etching procedure may be utilized to apply the etching composition of this invention to etch any of the aforementioned metallic materials. Among the conventional techniques which may be utiized to apply the etching composition of this invention as an etchant for the aforementionad metallic materials include splashing, brushing, force flow, etc. Any conventional etching machine may be utilized to apply the composition of this invention to the aforementioned metallic materials. Among the typical machines which may be utilized are included Master PC–32 etching machine, sold by Master Etching Machine Company of Wyncote, Pa., "Kopr-Matic" manufactured by Chemco Photo Products and "Empire" manufactured in Denmark by Brdr. Luth.

The following examples are intended to merely illustrate the invention and should not be construed as limitations on the scope of the invention.

Example 1

This example is directed to etching with an etching solution in accordance with this invention.

An etching solution was prepared by mixing the following components:

| Components: | Amounts |
|---|---|
| Ferric chloride 30° Bé ---------------gal-- | 16.5 |
| Film forming composition (comprising 50 parts by weight of formamidine disulfide dihydrochloride, 55 parts by weight of ethylene thiourea and 10 parts by weight of 2–4 diaminophenol dihydrochloride) -----grams-- | 210 |

The photo-engraving copper plates labelled A, B and C were each photo-printed with an image of a test object pattern consisting of parallel lines 0.1 mm. wide separated by a 5.0 mm. space and parallel lines 0.03 mm. wide separated by 0.17 mm. The copper plates were treated with a commercial photo-resist material sold by the Chemco Photo Products Company under the trade name "Kopr-Top."

The above solution was applied to the photo-printed copper plate labelled A by means of a Master PC–32 H.S.

etching machine sold by Master Etching Machine Company, of Wyncote, Penn. The machine was equipped with two 8″ diameter counter-rotating paddles located 12″ (center line of shaft), below the test plate to be etched. The plates to be etched were suspended horizontally face down the etching solution being splashed upwardly against the plate surfaces by the paddle wheel. The temperature during etching was maintained at about 80° F. The paddles were rotated at a speed of about 750 r.p.m. The etching of the copper plate was continued for 10 minutes. After this period, copper plate A was removed, and the slope of the sidewall of each of the etched lines was measured by measuring the perpendicular depth of the etch from the bottom of sidewalls to the surface of the copper plate and the horizontal distance from the edge of the etch line to its intersection with the perpendicular line from the bottom of the sidewall to the surface of the copper plate. From this information the tangent of the angle thus formed was computed and by the use of trigonometric tables, the angle between the perpendicular to the surface of the copper plate from the bottom of the etch and the slopping sidewall was determined. The slope of this angle and depth of the etch are set forth in Table I. The angle and depth as reported in Table I is the average angle and depth for all of the parallel lines 0.1 mm. wide and all of the parallel lines 0.03 mm. wide.

After Plate A was removed from the etching solution, 1.0 gram of L-ascorbic acid were added to the etching solution. This etching solution with the 1.0 gram of L-ascorbic acid (0.016 gram/liter) was then applied to copper Plate B in the manner described with respect to copper Plate A. After ten minutes, Plate B was removed from the copper bath. The average angle between the perpendicular to the surface of the copper plate from the bottom of the etch and the sloping sidewall and average depth was determined for the lines 0.1 mm. wide and 0.03 mm. wide in the manner outlined above. The average angle and depth of the etch for Plate B are set forth in Table I.

After Plate B was removed from the etching solution, an additional 1.0 gram of L-ascorbic acid were added to the etching solution in order to bring the concentration of L-ascorbic acid in the etching solution to 0.032 gram per liter. This etching solution with the additional L-ascorbic acid was then applied to copper Plate C in the same manner as described above with respect to copper Plate A. After ten minutes Plate C was removed from the copper bath. The average angle between the perpendicular to the surface and the sloping sidewall and the average depth was determined for the lines 0.1 mm. wide in the manner outlined above. The average angle and depth of the etch for Plate C are set forth in Table I.

TABLE I.—CONC. OF ASCORBIC ACID vs. DEPTH OF ETCH AND SIDEWALL'S ANGLE FOR PHOTO ENGRAVED COPPER PLATES

| Plate | Conc. of ascorbic acid in etching solution (gram/liter) | Angle of side wall etch (deg.) | | Depth of etch, (mm.) | |
|---|---|---|---|---|---|
| | | 0.1 mm. lines | 0.3 mm. lines | 0.1 mm. lines | 0.3 mm. lines |
| A | 0 | 47.9 | 19.6 | 0.3 | 0.14 |
| B | 0.016 | 45.5 | 13.4 | 0.34 | 0.168 |
| C | 0.032 | 41.8 | 13.2 | 0.35 | 0.16 |

As seen from Table I, the use of ascorbic acid results in an increase in the etching rate and a decrease in the sidewall slope. The latter is shown by the fact that when ascorbic acid is utilized as in the etching of plates B and C, the angle of slope was substantially eliminated.

Furthermore, it was observed that in the case of Plates B and C the etched portions sloped smoothly and uniformly from the plate surface, whereas in the case of Plate A the surface flared at approximately 0.01 mm. from the top of the surface of the plate, down the etched portion, an average distance of 0.06 mm. from the vertical section of the etch. In this manner, the slope of the sidewall of Plate A was not uniform nor smooth. Hence, by utilizing ascorbic acid in an etching bath a uniform slope is provided to the sidewalls of the etch, thereby preventing undercutting of the protective film formed on the sidewalls.

EXAMPLE 2

This example is directed to the preparation and testing of an etching composition prepared according to another embodiment of this invention showing that the addition of ascorbic acid controls the bottom smoothness of the etched surface.

An etching solution was prepared by mixing the following components:

Components:

| | | |
|---|---|---|
| Ferric chloride (30° Bé.) | liters | 23.6 |
| Formamidine disulfide | grams | 70.0 |

Three photo-engraving copper plates were each photo-printed with an image of a test object pattern consisting of 2–120 lines per inch half tone gray scales, together with type and line matter. The copper plates were treated with a commercial photo-resist material sold by the Chemco Photo Products Company under the trade name "Kopr-Top." The copper plates were labelled E, F and G.

The above solution was applied to the photo-printed copper plate E by means of a Master PC–32 etching machine sold by Master Etching Machine Company of Wyncote, Pa. The machine was equipped with two 8″ diameter counter-rotating paddles located 12″ (center line of shaft), below the test plate to be etched. The plates to be etched were suspended horizontally face down with the etching solution being splashed upwardly against the plate surfaces by the paddle wheel. The temperature during etching was maintained at about 78° F. The paddles were rotated at a speed of 550 r.p.m. The etching of the copper plate was continued for 3 minutes. After this period plate E was removed from the etching bath and it was observed that in copper plate E highlight dots of initial diameter less than 0.001″ were etched away. This is considered acceptable condition in commercial practice.

The bottoms of the etch in plate E were observed and it was found that the bottoms were rough.

After plate E was removed from the etching bath 2.0 grams of L-ascorbic acid were added to the etching bath so that the concentration of L-ascorbic acid was .088 gram per liter. Plate F was etched for three minutes in the etching bath in the same manner as plate E. After three minutes had elapsed it was observed that in copper plate F, highlight dots of initial diameter of less than 0.001″ were etched away. However, it was observed that some of the bottom roughness found in the etches made in plate E was eliminated.

After plate E was removed, another gram of L-ascorbic acid was added to the etching bath so that the concentration of ascorbic acid in the etching plate was now 0.132 gram per liter. Plate G was etched for three minutes in this etching bath in the same manner as plate E. After three minutes had elapsed, it was observed that in the copper plate G, highlight dots of initial diameter of less than 0.001″ were etched. Furthermore, it was observed that the bottoms of the etch were smooth and there was no roughness at the bottom of the etches. Hence, by utilizing a concentration of 0.132 gram per liter of L-ascorbic acid in an etching bath bottom roughness of the etched surface was entirely eliminated.

From a comparison of plates E, F and G it is seen that by adding ascorbic acid in sufficient quantity to an etching bath, bottom roughness in the etched surface can be eliminated without reducing the diameter of the etch. By removing the bottom roughness of the etched surfaces, the plates are highly suitable and desirable for commercial use.

What we claim is:

1. A powderless etching bath composition comprising aqueous solution of ferric chloride, from about 0.01 to about 1 gram per liter of ascorbic acid and from about 0.4 to about 4 grams per liter of a water soluble thiourea derivative adapted to form a cuprous thiourea complex with cuprous ions.

2. A powderless etching bath composition comprising aqueous solution of ferric chloride, from about 0.01 gram per liter to about 1 gram per liter of ascorbic acid and from about 0.4 gram to about 4 grams per liter of a thiourea derivative soluble in water and adapted to form a cuprous thiourea complex with cuprous ions said thiourea derivative being selected from the group consisting of formamidine disulfide, formamidine disulfide hydrochloride, ethylene thiourea, substituted ethylene thiourea having a solubility of at least 0.4 gram per liter of water, thiourea, and cuprous thiourea chloride.

3. An etching bath composition according to claim 2 wherein the concentration of ferric chloride is from about 20° Bé to about 48° Bé.

4. The method of etching a photoengraved printing plate of a metal selected from the group consisting of copper, copper alloys, and nickel alloys, said object having at least a portion of the surface masked with a resist coating, which comprises impinging upon the surface of the group aforesaid an etching composition comprising an aqueous solution of ferric chloride, from about 0.01 gram per liter to about 1 gram per liter of ascorbic acid and from about 0.4 gram to 4 grams per liter of a water soluble thiourea derivative adapted to form a cuprous thiourea complex with cuprous ions.

5. Method according to claim 4 in which said metal object is a copper plate.

6. A method according to claim 4 in which said metal object is a plate of copper alloy.

7. Method of claim 4 in which said thiourea derivative selected from the group consisting of formamidine disulfide, formamidine disulfide hydrochloride, ethylene thiourea, substituted ethylene thiourea having a solubility of at least 0.5 gram per liter of water, thiourea and cuprous-thiourea chloride.

8. A method of etching a photoengraved printing plate of a metal selected from the group consisting of copper, copper alloys and nickel alloys, the object having at least a portion of its surface masked with a resist-coating, which comprises impinging upon the surface of the object etching solution comprising from about 20° to about 48° Bé of an aqueous solution of ferric chloride, from about 0.4 to about 4 grams per liter of a water soluble thiourea derivative adapted to form a cuprous-thiourea complex with cuprous ions and selected from the group consisting of formamidine disulfide, formamidine disulfide hydrochloride, ethylene thiourea, substituted ethylene thiourea having a solubility of at least 0.5 gram per liter in water, thiourea and cuprous-thiourea chloride, and from about 0.1 to about 1 gram per liter of ascorbic acid.

9. The method according to claim 8 wherein said metal object is a copper plate.

10. The method according to claim 8 in which said metal object is a plate of copper alloy.

References Cited

UNITED STATES PATENTS 3,161,552 12/1964 Bradley et al. ------- 156—14

JACOB H. STEINBERG, Primary Examiner

U.S. Cl. X.R.

252—79.4